US006809917B2

(12) United States Patent
Charles

(10) Patent No.: US 6,809,917 B2
(45) Date of Patent: Oct. 26, 2004

(54) SAFETY DEVICE MONITORING HEAT IN ELECTRIC CONNECTION INSTALLATIONS

(76) Inventor: Cyril Charles, "La Pereuse"-Commune de Cars, F-33390 Blaye (FR)

( * ) Notice: Subject to any disclaimer, the term of this patent is extended or adjusted under 35 U.S.C. 154(b) by 0 days.

(21) Appl. No.: 10/168,992

(22) PCT Filed: Dec. 26, 2000

(86) PCT No.: PCT/FR00/03684

§ 371 (c)(1), (2), (4) Date: Oct. 23, 2002

(87) PCT Pub. No.: WO01/48774

PCT Pub. Date: Jul. 5, 2001

(65) Prior Publication Data

US 2003/0054679 A1 Mar. 20, 2003

(30) Foreign Application Priority Data

Dec. 28, 1999 (FR) ........................................... 99 16556

(51) Int. Cl.[7] ................................................ H02H 1/00

(52) U.S. Cl. ..................................................... 361/124

(58) Field of Search .......................... 337/18, 407, 408, 337/409, 32; 361/124, 119, 51

(56) References Cited

U.S. PATENT DOCUMENTS 2,056,118 A 9/1936 Charles
3,026,392 A 3/1962 Frederick
3,046,536 A 7/1962 Alfred
3,254,179 A * 5/1966 Howard ....................... 337/18
3,825,866 A * 7/1974 Piccione
4,084,147 A 4/1978 Mlyniec et al.
4,085,397 A 4/1978 Yagher, Jr.
4,152,576 A * 5/1979 Blair
4,188,561 A * 2/1980 Pranke et al.
4,314,304 A * 2/1982 Baumbach .................. 337/32
4,380,036 A * 4/1983 Coren ......................... 361/124
4,733,325 A * 3/1988 Loesch ....................... 361/124
5,583,734 A * 12/1996 McMills et al. ............ 361/124

FOREIGN PATENT DOCUMENTS

FR 2760564 9/1998

* cited by examiner

*Primary Examiner*—Neil Abrams
(74) *Attorney, Agent, or Firm*—Young & Thompson

(57) ABSTRACT

A safety device for monitoring heat in electrical installations includes a first connecting element in thermal relationship with an electrical connection to be monitored, a second element designed to be connected to ground, and an electrical connecting structure that connects the two elements and can adopt two states, one an insulating state in normal operating conditions and the other an interrupting state wherein there is contact and hence grounding of the first element with the second when a critical temperature is reached. The electrical connecting structure may include a fusible ring that releases a piston, or an insulative thermoretractable sheet that retracts.

15 Claims, 2 Drawing Sheets

SAFETY DEVICE MONITORING HEAT IN ELECTRIC CONNECTION INSTALLATIONS

Priority is claimed from French Application 99/16556 filed Dec. 28, 1999 through PCT Application PCT/FR00/03684 filed Dec. 26, 2000, by means of 35 U.S.C. §371.

BACKGROUND OF THE INVENTION

The present invention relates to a device for thermal monitoring for an electrical installation and more particularly a device sensitive to heating of the connection.

There are known electrical installations provided with different safety devices and particularly devices sensitive to increases in the intensity of a flowing current (fusible and disconnectable) and devices for the detection of the loss of current to the ground (differential devices).

Experience has however shown that a number of accidents have taken place by heating of connections in a bad condition. These faulty connections are not protected by present safety devices and are substantially undetectable both by electricians and by the control agencies particularly during the reception of work. This risk is greater because the quality of connections can only deteriorate with time.

SUMMARY OF THE INVENTION

The present invention has for its object to overcome these drawbacks by providing a thermal monitoring device which is sensitive to the heating produced by a defective connection.

The present invention thus has for its object a thermal monitoring device for a connection of an electrical installation, characterized in that it comprises a first connecting element in heat and electrical relation with a connection to be monitored, a second connection element in electrical relationship with the ground of the installation, electrical connection means which interconnect the two connection means and which are adapted to have two conditions, namely a first or normal condition of operation in which they are electrically insulated, and a second rupture condition in which they become electrically conductive when they reach a critical temperature.

In one embodiment of the invention, the electrical connection means are such that when they reach the critical temperature, they pass, irreversibly, from a non-conductive condition to a conductive condition.

The connection means could be constituted by a conductive piston in electrical connection with the first connection, which is urged by resilient means toward the second connection, against fusible retention means which melt when the connection to be monitored reaches the critical temperature.

The connection means could also be constituted by an insulating element of the thermoretractable type, whose one surface, called the recto, is in contact with the first connection and the second surface, called the verso, is in contact with the second connection, this element being such that, when the temperature of the connection to be monitored reaches the critical temperature, it retracts thereby exposing a contact surface of the first connection with the second.

In a modification of this embodiment of the invention, the thermal monitoring device comprises an electrical sensor and conductor which is electrically connected to a second connecting element and whose one free end comes into contact with the verso of the thermoretractable insulating element in the contact surface adapted to be exposed.

The thermal monitoring device can be disposed in parallel to the terminals of the connection to be monitored but also can be totally integrated into the latter. In such an embodiment, the first connection element will be constituted by a mechanical constituent of the connection.

BRIEF DESCRIPTION OF THE DRAWINGS

There will be described hereafter, by way of non-limiting examples, various embodiments of the present invention, with reference to the accompanying drawings, in which.

DESCRIPTION OF THE PREFERRED EMBODIMENTS

Figure 1:
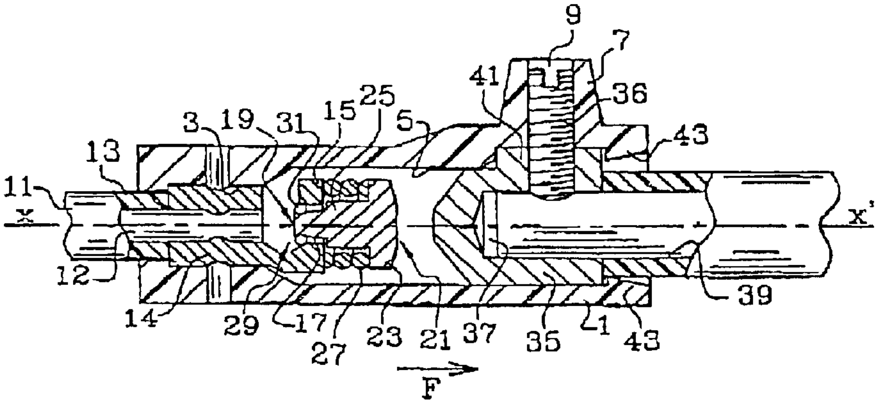
FIG. 1 is a longitudinal and transverse cross sectional view of a first embodiment of a thermal monitoring device according to the invention.

The thermal monitoring device shown in FIG. 1 is constituted by a housing 1 made of an insulating material such as for example a plastic material, which is pierced at a first end with a cylindrical recess 3 which is prolonged toward the other end by a cylindrical recess 5 on the same axis and of greater diameter. The second end of the housing 1 comprises a radial boss 7 pierced with the radial opening 9.

The recess 3 permits receiving an electric wire 11 whose conductor 12 is thermally and electrically connected with a connection to be monitored located in immediate proximity and not shown in the drawing. The sheath 13 of the electric wire 11 is omitted over a certain length so as to expose the conductor 12, which receives a metallic cable terminal 14 which is fixed to it by clamping. This cable terminal terminates at one end 15 that is transversely bent. The end 15 is pierced with an axial hole 17 which receives a rod 19 of a piston 21, this piston being provided with a head 23 of greater diameter and an intermediate portion 25.

The portion 25 is surrounded by a coil compression spring 27 which, on the one hand, bears against the end portion 15 of the cable terminal 3 and, on the other hand, against the head 23 of the piston 21, such that it exerts on the head of this piston a force in the direction of the arrow F. The free end of the rod 19 of the piston 21 is hollow with a circular groove 29 in which is disposed a ring 31 of fusible material. This fusible material 31 ensures holding the piston 21 in position against the force of compression exerted by the head 23 of the latter via the spring 27, such that, when the holding force of the ring 31 is overcome, the piston 21 is expelled in the direction of the arrow F. The fusible material constituting the ring 31 is such that at a given temperature, called the critical temperature, the force exerted by the spring 27 on the piston head 23 is greater than the holding force exerted by the fusible ring 31, whereby the piston is freed.

The second end of the housing 1 receives a metallic member 35 of cylindrical shape which comprises an axial recess 37 receiving an electrical conductor 39 which is connected to the ground of the installation. The element 35 is pierced with a screw threaded hole receiving a locking screw 36 which enters the recess 9 of the boss 7, and which ensures the connection of the piece 35 with the conductor 39.

The holding in position of the piece 35 is ensured on the one hand by a fitting 41 at its upper portion in a corresponding recess provided in the housing 1 and by resilient bosses 43 provided at the end of the latter.

Under these conditions, the operation of the thermal monitoring device takes place as described above. When the connection (not shown in the drawing) to which is connected the electrical conductor 12 heats up (e.g., due to a defective connection), the heat thus produced is transmitted by the conductor and the cable terminal 13 to the thermofusible ring 31. When the temperature to which the ring 31 is subjected is below the critical temperature, the ring 31 ensures the holding of the piston 21 against the force of the spring 27. When this temperature increases and reaches the critical temperature, the fusible ring 31 no longer performs its holding function, and the spring 27 presses the piston 21 in the direction of the arrow F to come into contact with the element 35. Under these conditions, an electrical connection is ensured between the connection and the ground of the circuit of the connection in question, thereby giving rise to cutting the current upstream by the triggering of the differential device.

If the user has not done what is necessary to overcome the problem connected with his connection, he cannot reestablish the current in the portion of his installation protected by the differential device in question.

The present invention thus permits detecting and signaling to the user any abnormal temperature elevation in the connections of his installation which are provided with the thermal monitoring device according to the invention.

Figure 2:
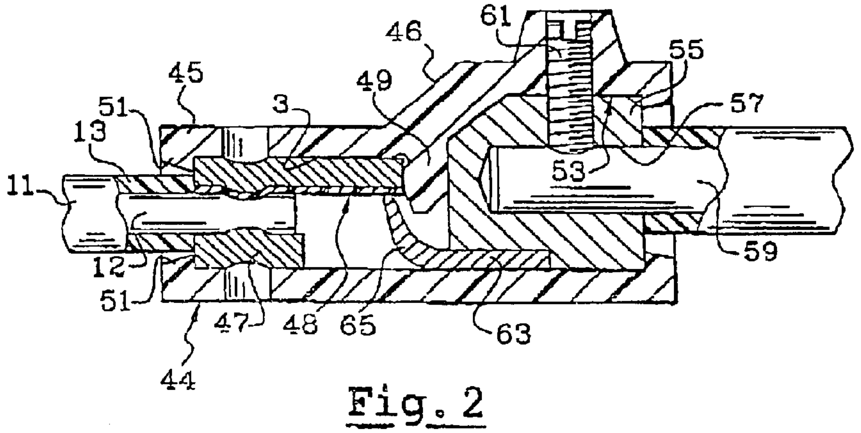
FIG. 2 is a longitudinal and transverse cross sectional view of a second embodiment of a thermal monitoring device according to the invention.

In the embodiment shown in FIG. 2, the housing 44 is constituted by a non-conductive material and comprises a front cylindrical portion 45 and rear portion forming a boss 46. As before, the portion 45 comprises an axial cylindrical recess 3 which receives one end of the electrical wire 11 whose conductor 12 is connected to an electrical connection (not shown in the drawing) located adjacent the device. The end of the electrical wire 11 is provided with a cable terminal 47 which is secured to the end of the conductor 12 of the wire 11. The cable terminal 47 comprises a front and upper end which extends toward the interior of the recess 3 and comes into abutment against an internal protuberance 49 of the housing 44. The cable terminal 47 is blocked on its rear portion by resilient abutments 51. The internal surface of the cable terminal 47 is covered with a sheet 48 of the thermoretractable type, which is to say sheet which, when it is brought to a predetermined temperature, retracts.

The internal portion of the boss 46 is hollow with a recess 53 which receives a metallic piece 55 of complementary shape, which is hollowed by a longitudinal recess 57 which receives an electrical conductor 59 which is connected to the ground.

As in the previous embodiment, the connection between the piece 55 and the conductor 59 is ensured by a set screw 61. The forward and lower portion of the element 55 is hollowed by a cavity 63 which receives a resilient metal element 65 which is radially incurved in the direction of the cable terminal 47, such that its free end comes into contact with the external surface of the thermoretractable sheet 48.

Under these conditions, the operation of the present thermal monitoring device takes place as described above. In normal operation, which is to say when the connection to be monitored (not shown in the drawing) is in good condition, and hence does not heat up, the thermoretractable sheet 48, by reason of its insulating qualities, prevents the contact of the element 65 with the cable terminal 47. When heating of the connection to be monitored takes place, the heat produced is transmitted by the conductor 12 to the cable terminal 47 and from the latter to the thermoretractable sheet 48, which, when the heating temperature reaches the critical temperature, retracts sufficiently that the free end of the element 65 will come into contact with the cable terminal 47. Under these conditions, the connection becomes connected to the ground, leading to interruption of the current upstream by the triggering of the differential circuit breaker.

Of course any other device could be provided between the connection and the conductive wire, connected to the ground and adapted to be triggered when the connection reaches the critical temperature.

Figure 4:
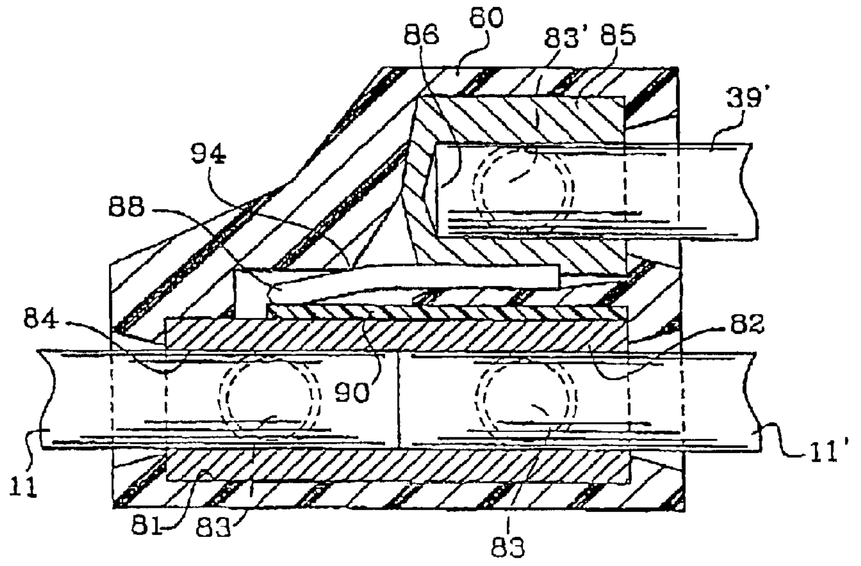
FIG. 4 is a transverse cross sectional view of a fourth embodiment of a thermal monitoring device according to the invention which is integrated with the connections to be verified of a socket.

There could according to the invention be provided a thermal monitoring device which will be integrated into the connection itself. There is shown in FIG. 4 such a device in the drawings at 80, which comprises at its space a parallelopipedal cavity 81 in which is fitted to be resiliently held a metallic domino 82 of a complementary shape which is pierced with an axial recess 84 adapted to receive two conductive elements 11, 11' to be connected, which are held in good contact with the domino 82 by the help of a set screw 83. The body 80 comprises an upper cavity in which is disposed a cylindrical metallic cable terminal 85 pierced with an axial recess 86 adapted to receive a conductor 39' which is held by a screw 83', this conductor being connected to the ground of the installation. There has been arranged, at the base of the cable terminal 85, a metallic leaf spring 88 which is contact with its free end with the upper surface of the domino 82. As before, the upper surface of this latter is covered with a thermoretractable sheet 90 which, under normal operation of the connection, ensures electrical insulation between the domino 82 and the blade spring 88. The resilient force of this latter blade spring can be improved by the contact of an abutment 94 provided in the body 80 which exerts a pressure against the spring. Under these circumstances, as before, when a heating of the connections of the domino 82 gives rise to heating, the thermoretractable film 90 contracts, thereby exposing a free contact of the blade spring 88 with the upper surface of the domino 82, thereby triggering the differential device as described above.

Figure 3:
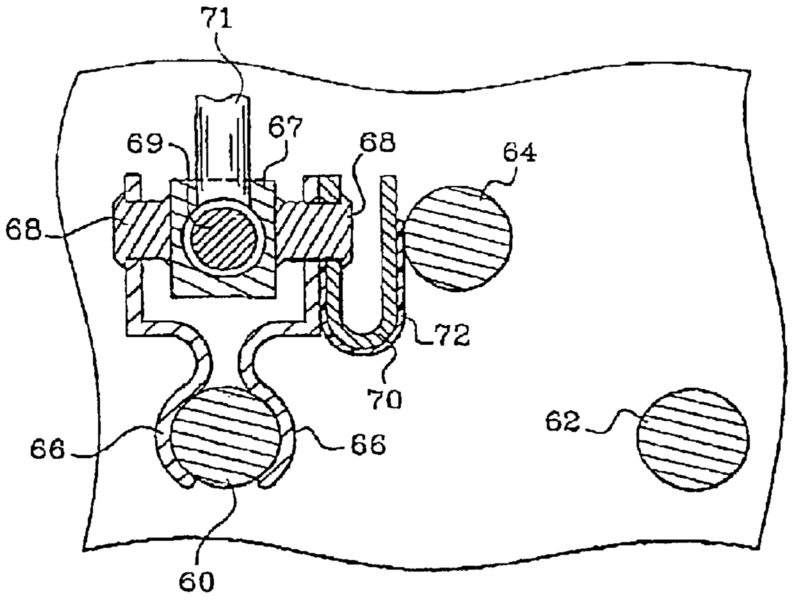
FIG. 3 is a longitudinal and transverse cross sectional view of a third embodiment of a thermal monitoring device according to the invention which is integrated into the connection to be monitored.

There is shown in FIG. 3 a modification of the embodiment of the invention, in which the thermal surveillance device is integrated with a socket.

There is shown schematically in this figure, in double hatched lines, the pins 60 and 62 secured to a plug adapted to be inserted in a socket and, in single hatched lines, a terminal 64 of a socket which is connected to the ground. Although the thermal monitoring device according to the invention can be disposed on each of the pins 60 and 62, it has been shown in FIG. 3 only relative to a pin 60. This socket also comprises resilient metallic element 66 adapted to ensure good electrical contact with the pin 60 and its resilient metallic elements are generally fixed or secured to a piece 67 provided with a recess permitting receiving the conductor 71 and the set screws 69 which ensures holding of the connection of the wire 71.

The thermal monitoring device is here integrated in the connection during clamping or riveting of the elements 66 and 67, and is constituted by a resilient conductive probe 70 whose shape and securement of the element 66 is held in contact on the ground contact 64. Along this probe 70, on the undersurface and during assembly, has been deposited a thermoretractable film 77 or the like, such that at normal temperature, it electrically insulates the probe 70 and the ground terminal 64. It will be understood, under conditions that, the connections existing between the elements 66 and the pin 60, either between the domino 67 and the conductor 68, are of good quality, there is no heating of these connections and that, under these circumstances the thermoretractable film 72 insulates the ground terminal from the elements 66 with good quality, and there is no heating of these connections, and that, under these circumstances, the thermoretractable filament 72 insulates the pin 64 from the elements 66. When one of these mentioned connections heats up, the heat is transmitted via the conductive rivets 68 to the probe 70, so that under these conditions the thermoretractable film contracts, thereby establishing electrical contact of the probe 70 with the ground pin 64. Under these conditions, as mentioned above, the differential device is activated, thereby ensuring cutting the current and the safety of the installation.

What is claimed is:

1. A thermal monitoring device for a connection of an electrical installation, comprising:

a first connecting element in thermal and electrical relation with a connection whose temperature is to be monitored, a second connecting element in electrical relation with the ground of the installation, and electrical connection means which extend between the first and second connecting elements and which are for having two conditions, namely a first or normal condition of operation in which the first and second connecting elements are electrically insulated from each other, and a second condition or rupture condition, in which the first and second connecting elements are electrically connected to each other when the electrical connection means reach a critical temperature due to a temperature-increasing defect in the connection whose temperature is to be monitored.

2. The device according to claim 1, wherein the first connection element is constituted by a mechanical constituent of the connection.

3. Device according to claim 1, wherein the electrical connection means change irreversibly from a non-conductive condition to a conductive condition when the electrical connection means reach the critical temperature.

4. The device according to claim 1, wherein the connection means are constituted by a conductive piston in electrical contact with the first connecting element and that is urged by resilient means toward the second connecting element against fusible retaining means which melt when the monitored connection reaches the critical temperature.

5. The device according to claim 2, wherein the electrical connection means change irreversibly from a non-conductive condition to a conductive condition when the electrical connection means reach the critical temperature.

6. The device according to claim 2, wherein the connection means are constituted by a conductive piston in electrical contact with the first connecting element and that is urged by resilient means toward the second connecting element against fusible retaining means which melt when the monitored connection reaches the critical temperature.

7. The device according to claim 3, wherein the connection means are constituted by a conductive piston in electrical contact with the first connecting element and that is urged by resilient means toward the second connecting element, against fusible retaining means which melt when the monitored connection reaches the critical temperature.

8. The device according to claim 5, wherein the connection means are constituted by a conductive piston in electrical contact with the first connecting element and that is urged by resilient means toward the second connecting element against fusible retaining means which melt when the monitored connection reaches the critical temperature.

9. The device according to claim 2, wherein the connection means comprise an insulating thermoretractable element with one surface, called the recto, in contact with the first connecting element and a second face, called the verso, in contact with the second connecting element, wherein when the temperature of the monitored connection reaches the critical temperature, the thermoretractable element retracts, thereby electrically connecting the first connecting element to the second connecting element.

10. The device according to claim 3, wherein the connection means comprise an insulating thermoretractable element with one surface, called the recta, in contact with the first connecting element and a second face, called the versa, in contact with the second connecting element wherein when the temperature of the monitored connection reaches the critical temperature, the thermoretractable element retracts, thereby electrically connecting the first connecting element to the second connecting element.

11. The device according to claim 9, further comprising a resilient probe which is conductive of electrical current and which is electrically connected to the ground of the installation and which one free end comes into contact with the versa of the thermoretractable insulating element.

12. The device according to claim 10, further comprising a resilient probe which is conductive of electrical current and which is electrically connected to the ground of the installation and which one free end comes into contact with the verso of the thermoretractable insulating element.

13. A thermal monitoring device for a connection of an electrical installation, comprising:

a first connecting element in thermal and electrical relation with a connection whose temperature is to be monitored;

a second connecting element in electrical relation with the ground of the installation; and an electrical connector which extends between the first and second connecting elements and which operates in a first condition in which the first and second connecting elements are electrically insulated from each other and in a second condition in which the first and second connecting elements are electrically connected to each other when the electrical connector reaches a critical temperature, wherein the electrical connector comprises an insulating thermoretractable element with one surface, called the recto, in contact with the first connecting element and a second face, called the recto, in contact with the second connecting element, wherein when the temperature of the monitored connection reaches the critical temperature, the thermoretractable element retracts, thereby electrically connecting the first connecting element to the second connecting element.

14. The device according to claim 13, further comprising a resilient probe which is conductive of electrical current and which is electrically connected to the ground of the installation and which one free end comes into contact with the verso of the thermoretractable insulating element.

15. A thermal monitoring device for a connection of an electrical installation, comprising:

a first connecting element in thermal and electrical relation with a connection whose temperature is to be monitored;

a second connecting element in electrical relation with the ground of the installation; and an electrical connector which extends between the first and second connecting elements and which operates in a first condition in which the first and second connecting elements are electrically insulated from each other and in a second condition in which the first and second connecting elements are electrically connected to each other when the electrical connector reaches a critical temperature, wherein the electrical connector comprises a conductive piston in electrical contact with the first connecting element and that is urged by resilient means toward the second connecting element and a fusible ring that wraps around one end of the piston and seats against a part of the first connecting element to hold the piston against the force of the resilient means and that melts when the monitored connection reaches the critical temperature.

* * * * *